US009912713B1

(12) United States Patent
Mackenzie et al.

(10) Patent No.: US 9,912,713 B1
(45) Date of Patent: Mar. 6, 2018

(54) SYSTEMS AND METHODS FOR PROVIDING DYNAMICALLY UPDATED IMAGE SETS FOR APPLICATIONS

(71) Applicant: MiMedia LLC, Wilmington, DE (US)

(72) Inventors: Scotty Mackenzie, Providence, RI (US); Nick Lewin, New York, NY (US); Christopher Giordano, New York, NY (US)

(*) Notice: Subject to any disclaimer, the term of this patent is extended or adjusted under 35 U.S.C. 154(b) by 533 days.

(21) Appl. No.: 13/717,407

(22) Filed: Dec. 17, 2012

(51) Int. Cl.
*G06F 15/16* (2006.01)
*H04L 29/06* (2006.01)

(52) U.S. Cl.
CPC ................... *H04L 65/601* (2013.01)

(58) Field of Classification Search
CPC ...................................... H04L 65/601
USPC ................. 709/204, 206, 217, 219
See application file for complete search history.

(56) References Cited

U.S. PATENT DOCUMENTS

| | | | |
|---|---|---|---|
| 5,778,395 A | 7/1998 | Whiting et al. |
| 5,835,963 A | 11/1998 | Ohran |
| 5,926,624 A | 7/1999 | Katz et al. |
| 6,212,512 B1 | 4/2001 | Barney et al. |
| 6,480,867 B1 | 11/2002 | Kwan |
| 7,035,943 B2 | 4/2006 | Yamane et al. |
| 7,346,512 B2 | 3/2008 | Li-Chun Wang et al. |
| 7,509,684 B2 | 3/2009 | McDonald et al. |
| 7,660,834 B2 | 2/2010 | Cannon et al. |
| 7,673,240 B2 | 3/2010 | Morgan |
| 7,685,175 B2 | 3/2010 | Carroll et al. |
| 7,873,040 B2 | 1/2011 | Karlsgodt |
| 8,090,690 B2 | 1/2012 | Zamkoff et al. |
| 8,095,606 B1 | 1/2012 | Wiley et al. |
| 8,135,800 B1 | 3/2012 | Walsh et al. |
| 8,209,540 B2 | 6/2012 | Brouwer et al. |
| 8,554,735 B1 | 10/2013 | Wible et al. |

(Continued)

OTHER PUBLICATIONS

Conner, N., "Using ITunes® 10", (Jan. 25, 2011), Que, p. 14 and p. 129.

(Continued)

*Primary Examiner* — Viet Vu
(74) *Attorney, Agent, or Firm* — Norton Rose Fulbright US LLP

(57) ABSTRACT

Systems and methods which provide dynamically updated image sets for applications are disclosed. Dynamically updated media sets may be utilized for a variety of personalized media features of applications, such as dynamically updated graphical user interface wallpaper, dynamically updated computer screen savers, dynamically updated smart phone ringtones, etc. A user may specify criteria for media sets to be dynamically updated using a configuration application. Accordingly, one or more applications, on one or more digital devices, having a personalized media feature may be configured to utilized dynamically updated media sets using media set profiles comprising selected media set criteria. The applications may thereafter be dynamically provided with the appropriate media sets. Accordingly, applications having a personalized media feature are enabled to utilize dynamically updated media sets providing personalized content which is highly relevant to the user, as determined using media set criteria of a media set profile.

48 Claims, 3 Drawing Sheets

(56) References Cited

U.S. PATENT DOCUMENTS

| | | | |
|---|---|---|---|
| 8,688,805 B2* | 4/2014 | Swanburg | H04M 3/4872 455/456.2 |
| 2002/0083366 A1 | 6/2002 | Ohran | |
| 2002/0133387 A1 | 9/2002 | Wilson et al. | |
| 2003/0038834 A1 | 2/2003 | Wen et al. | |
| 2003/0050062 A1* | 3/2003 | Chen | H04L 29/06027 455/435.1 |
| 2003/0055671 A1 | 3/2003 | Nassar | |
| 2003/0098894 A1 | 5/2003 | Sheldon et al. | |
| 2004/0158546 A1 | 8/2004 | Sobel et al. | |
| 2004/0177319 A1 | 9/2004 | Horn | |
| 2004/0193672 A1 | 9/2004 | Samji et al. | |
| 2004/0236859 A1 | 11/2004 | Leistad et al. | |
| 2005/0071392 A1 | 3/2005 | Sandorfi et al. | |
| 2005/0102635 A1 | 5/2005 | Jiang et al. | |
| 2005/0108253 A1 | 5/2005 | Metsatahti et al. | |
| 2005/0114595 A1 | 5/2005 | Karr et al. | |
| 2005/0131902 A1 | 6/2005 | Saika | |
| 2005/0138066 A1 | 6/2005 | Finke-Anlauff et al. | |
| 2005/0223277 A1 | 10/2005 | Ballard | |
| 2006/0015637 A1 | 1/2006 | Chung | |
| 2006/0036611 A1 | 2/2006 | Rothschild | |
| 2006/0155790 A1 | 7/2006 | Jung et al. | |
| 2006/0161635 A1 | 7/2006 | Lamkin et al. | |
| 2006/0179079 A1 | 8/2006 | Kolehmainen | |
| 2006/0195512 A1 | 8/2006 | Rogers et al. | |
| 2006/0224602 A1 | 10/2006 | Rawat et al. | |
| 2006/0230440 A1 | 10/2006 | Wu et al. | |
| 2006/0242325 A1 | 10/2006 | Ramaswamy et al. | |
| 2006/0277123 A1 | 12/2006 | Kennedy et al. | |
| 2006/0288168 A1 | 12/2006 | Stevenson | |
| 2006/0291720 A1 | 12/2006 | Malvar et al. | |
| 2007/0048714 A1 | 3/2007 | Plastina et al. | |
| 2007/0055993 A1 | 3/2007 | Braun et al. | |
| 2007/0088678 A1 | 4/2007 | Farago et al. | |
| 2007/0106714 A1 | 5/2007 | Rothbarth | |
| 2007/0122111 A1 | 5/2007 | Yamamoto et al. | |
| 2007/0130400 A1 | 6/2007 | Reisman | |
| 2007/0288536 A1 | 12/2007 | Sen et al. | |
| 2007/0296581 A1 | 12/2007 | Schnee et al. | |
| 2008/0015878 A1* | 1/2008 | Feng | G06Q 30/02 705/1.1 |
| 2008/0022058 A1 | 1/2008 | Nadathur et al. | |
| 2008/0040139 A1 | 2/2008 | Pousti et al. | |
| 2008/0060069 A1 | 3/2008 | Vindici | |
| 2008/0082678 A1 | 4/2008 | Lorch et al. | |
| 2008/0109414 A1 | 5/2008 | Chun et al. | |
| 2008/0115071 A1 | 5/2008 | Fair | |
| 2008/0126303 A1 | 5/2008 | Park et al. | |
| 2008/0133622 A1 | 6/2008 | Brown et al. | |
| 2008/0222734 A1 | 9/2008 | Redich et al. | |
| 2008/0250190 A1 | 10/2008 | Johnson | |
| 2008/0270395 A1 | 10/2008 | Gossweiler, III et al. | |
| 2008/0294453 A1 | 11/2008 | Baird-Smith et al. | |
| 2008/0306872 A1 | 12/2008 | Felsher | |
| 2008/0307314 A1 | 12/2008 | Cisler et al. | |
| 2008/0319856 A1 | 12/2008 | Zito et al. | |
| 2009/0006643 A1 | 1/2009 | Lee | |
| 2009/0019486 A1 | 1/2009 | Kalaboukis | |
| 2009/0022129 A1 | 1/2009 | Karaoguz et al. | |
| 2009/0024675 A1 | 1/2009 | Hewitt et al. | |
| 2009/0132921 A1 | 5/2009 | Hwangbo et al. | |
| 2009/0178003 A1 | 7/2009 | Fiedler | |
| 2009/0240735 A1 | 9/2009 | Grandhi et al. | |
| 2009/0252033 A1 | 10/2009 | Ramakrishnan et al. | |
| 2009/0282336 A1 | 11/2009 | Lindley et al. | |
| 2009/0327904 A1 | 12/2009 | Guzak et al. | |
| 2010/0094728 A1 | 4/2010 | Denning et al. | |
| 2010/0180213 A1 | 7/2010 | Karageorgos et al. | |
| 2010/0241731 A1 | 9/2010 | Du et al. | |
| 2010/0280931 A1* | 11/2010 | Lim | G06Q 30/02 705/34 |
| 2010/0325549 A1 | 12/2010 | Gibson et al. | |
| 2011/0004683 A1 | 1/2011 | Kottomtharayil et al. | |
| 2011/0060994 A1 | 3/2011 | Maxwell et al. | |
| 2011/0060998 A1 | 3/2011 | Schwartz et al. | |
| 2011/0106910 A1 | 5/2011 | Grasset | |
| 2011/0111738 A1* | 5/2011 | Jones | G06Q 30/02 455/414.1 |
| 2011/0185283 A1* | 7/2011 | Jun et al. | 715/745 |
| 2011/0243534 A1 | 10/2011 | Thomas et al. | |
| 2012/0030018 A1* | 2/2012 | Passmore | G06F 17/30702 705/14.52 |
| 2012/0072956 A1 | 3/2012 | Thomas et al. | |
| 2012/0210220 A1 | 8/2012 | Pendergast et al. | |
| 2012/0210351 A1 | 8/2012 | Nukala et al. | |
| 2012/0265604 A1 | 10/2012 | Corner et al. | |
| 2012/0330963 A1 | 12/2012 | Bartholomew | |
| 2013/0024582 A1 | 1/2013 | Rodrigues | |
| 2013/0061131 A1 | 3/2013 | Zito et al. | |
| 2013/0066856 A1 | 3/2013 | Ong et al. | |
| 2013/0124628 A1* | 5/2013 | Weerasinghe | G06Q 30/0241 709/204 |
| 2013/0162411 A1* | 6/2013 | Moses et al. | 340/12.5 |
| 2013/0173531 A1 | 7/2013 | Rinearson et al. | |
| 2013/0222154 A1* | 8/2013 | Mori et al. | 340/905 |
| 2013/0332379 A1* | 12/2013 | Hayes et al. | 705/319 |
| 2014/0188890 A1 | 7/2014 | Clifton et al. | |

OTHER PUBLICATIONS

Linder, "Humyo offers 30GB of free online storage", Jun. 25, 2008, [retrieved on Jul. 23, 2013], retrieved from the Internet: URL: http://downloadsquad.switched.com/2008/06/25/humyor-offers-30gb-of-free-online-storage/1 page.

W3Schools.com, "AJAX Introduction", Apr. 19, 2010, [retrieved on Jul. 24, 2013], retrieved from the Internet: URL: http://web.archive.org/web/20100419011010/http://www.w3schools.com/ajax/ajax_intro.asp/, p. 1-2.

International Search Report and Written Opinion issued for PCT/US2010/036105, dated Jul. 13, 2010, 11 pages.

Apple Inc., "iTunes 8", © 2009, ver. 8.2.1.6, p. 1-17.

Pash, "Huymo Provides 30GB of Free Online Storage", Jun. 25, 2008, [retrieved from the Internet on Oct. 22, 2014], <URL http://lifehacker.com/397108/huymo-provides-30gb-of-free-online-storage/>, p. 1-9.

Unpublished U.S. Appl. No. 13/103,744 to Wible et al., filed May 9, 2011 and entitled "Centralized Music Media Gallery," 32 pages.

Newman, "Amazon Cloud Drive and Cloud Player: A Hands-On Tour", Mar. 29, 2011, <URL http://www.pcworld.com/article/223604/Amazon_Cloud_Drive_and_Cloud_Player_A_Hands_On_Tour.html/>, p. 1-3.

* cited by examiner

SYSTEMS AND METHODS FOR PROVIDING DYNAMICALLY UPDATED IMAGE SETS FOR APPLICATIONS

TECHNICAL FIELD

The invention relates generally to use of media by applications and, more particularly, to providing dynamically updated media sets for use by applications.

BACKGROUND OF THE INVENTION

The use of digital devices, such as personal computers (PCs), personal digital assistants (PDAs), smart phones, media players, tablet devices, etc., has become nearly ubiquitous. Often a user has multiple such devices, whether operable to provide the same or different functionality, and considers the use of their devices necessary to function professionally and/or socially.

Despite the homogeneous nature of these mass-produced and mass-marketed digital devices, various features are often provided for the digital devices to be personalized for the user. For example, digital devices such as PCs, PDAs, smart phones, and tablet devices often have an application with the capability to allow a user to capture or store an image file on the device and to use that image file to provide a personalized background (often referred to as a "wallpaper" feature). Similarly, digital devices such as PCs and tablet devices often have an application with the capability to allow a user to capture or store one or more image files on the device and to use that image file to display those one or more image files when the device is idle (often referred to as a "screen saver" feature). Digital devices such as PCs, PDAs, tablet devices, and smart phones often have the capability to allow a user to capture, select, or store an audio file and/or an image file for an alert, such as an incoming call notification (often called a "ring tone" feature for the audio alert and an "avatar" feature for the image alert) or for a status alert (often called a "program event tone" feature for the audio alert).

The foregoing features, although allowing a user to personalize their devices, are typically cumbersome to use and provide substantially static use of media. For example, not only must each of a user's digital devices be individually and manually configured by the user to implement the personalized media, but each application which includes a personalized media feature typically must be individually and manually configured. Unfortunately, the applications, whether on the same digital device or on different digital devices, implement a unique interface for configuring their personalized media features. Moreover, the user must upload the desired media file, capture the desired media file (e.g., by taking a digital photo or digitally capturing a sound sample), or otherwise find and harvest the desired media file (e.g., from a connected device or via a network). Although some digital devices provide a database of media files which may be used in a personalized media feature, such databases are generally very limited and the relevance of these media files to the user, and thus their applicability as personalized media, is generally dubious. Accordingly, where a user takes the time to utilize the personalized media feature of an application on a digital device, the personalized media tends to remain relatively static. Moreover, a user often does not take the time to utilize the personalized media feature of applications of each of their digital devices, or even for each of the applications having personalized media features on any single digital device.

BRIEF SUMMARY OF THE INVENTION

The present invention is directed to systems and methods which provide dynamically updated image sets for applications. Embodiments of the invention provide a cloud computing based solution (i.e., providing for the delivery of computing capacity as a service to a heterogeneous community of end-recipients over a network) in which dynamic updates of personalized media features of applications operable upon various digital devices is provided as a network service. Dynamically updated media sets of embodiments of the invention may be utilized for a variety of personalized media features of applications, such as dynamically updated wallpaper of an operating system graphical user interface, dynamically updated screen savers of a computing platform, dynamically updated ringtones of a smart phone, and/or the like.

In operation according to embodiments of the invention, a user may specify criteria for media sets to be dynamically updated using a configuration application, such as may be operable upon a digital device of the user. Media set profiles comprising such media set criteria are preferably adapted for use with respect to a variety of digital devices and applications. That is, media set profiles of embodiments are applicable to a supported universe of a plurality of digital devices and applications. Accordingly, one or more applications, on one or more digital devices, having a personalized media feature may be configured to utilize dynamically updated media sets using the foregoing media set profiles comprising selected media set criteria. For example, the media set criteria may be provided to a media set configuration server which operates to appropriately configure the applications and/or a media set management application in communication therewith for dynamically updating personalized media features with appropriate media sets. The applications may thereafter be dynamically provided with the appropriate (i.e., having content relevant to the media set profile) media sets, such as by a media content server operating in cooperation with a media set server, whether periodically, aperiodically, or a combination thereof. Accordingly, applications having a personalized media feature are enabled to utilize dynamically updated media sets providing personalized content which is highly relevant to the user, as determined using media set criteria for a media set profile. Moreover, the user is enabled to configure various applications across multiple digital device platforms conveniently, simultaneously, and using a common interface.

Media set profiles used to generate media sets for dynamically updating personalized media features of applications may utilize a number of criteria to facilitate identification of media which is relevant to the user and which is refreshed as desired by the user. For example, media set criteria may specify subject matter (e.g., a place, person, event, etc.), time constraints (e.g., media generated on or after a date, media containing content meeting a time parameter, time restrictions with respect to particular subject matter, etc.), location constraints (e.g., media generated at a particular location, location restrictions with respect to particular subject matter, etc.), device constraints (e.g., subject matter restrictions for particular devices, location restrictions for particular devices, features of devices to utilize or not to utilize, etc.). Such media set criteria may be used by a media set configuration server for appropriately configuring the applications and/or a media set management applications (e.g., establishing a media set refresh frequency and configuring one or more aspect of the digital device and/or the personalized media features operable thereon for implementing dynamic updating of personalized media features as desired by the user. Moreover, such media set criteria may be used by a media set server for generating media sets. The media content server then provides those media sets to the individual digital devices for implementing dynamic updating of personalized media features as desired by the user.

The user need not specify all or even any of the media set criteria of a media set profile in order to implement dynamically updated personalized media features which are relevant to the user according to embodiments herein. For example, third parties (e.g., sports team franchises, musical groups, political parties, social organizations, governmental entities, commercial enterprises, etc.) may create media set profiles (e.g., related to their goods, services, interests, activities, etc.) and make those media set profiles available for use by users. Accordingly, a user interested in the third party or otherwise interested in media associated with such third party provided media set profiles may simply select a relevant published media set profile for implementing dynamic updating of personalized media features. It should be appreciated that, in addition to providing the foregoing media set profiles, the third party may additionally publish media (e.g., content from sporting events, musical venues, political rallies, social events, government works, product announcements, etc.) used in the associated media sets.

Media used to generate a media set herein may be obtained from a number of sources according to embodiments of the invention. Media of media sets used to dynamically update a personalized media feature of an application may come from private sources, public sources, or a combination thereof. For example, media may be obtained for generating media sets by a media set server from private sources, such as the user's social media account(s), the user's media storage/management account(s), the user's media sharing account(s), and the like. Additionally or alternatively, media sets herein may be generated from public sources of media, such as publicly available portions of social media accounts, publicly available portions of media sharing accounts, public Internet content, content published for use in media sets, and the like. A media set server of embodiments herein may not only acquire appropriate media for media sets from any of the foregoing sources, but the media set server may aggregate media from a plurality of sources to generate a media set meeting the user's media set profile which otherwise would not exist as a collection. It can be appreciated from the foregoing that, not only is the base of content available for use in personalized media features of a user's application substantially broadened, but using cloud based sources for the media of media sets facilitates dynamic updating of the personalized media features without the user being required to upload the media files, capture the media files, or otherwise find and harvest the media files.

Media content servers and media set servers of embodiments of the invention operate together to provide services in addition to the aforementioned media set generation alone. For example, media content servers operate to dynamically provide media to the various digital devices which not only are relevant to the applicable media set profile, but which are adapted for the particular digital device to which the media set is provided. Such adaptation may include transcoding (e.g., adjusting a resolution, a size, a sampling rate, a frame rate, etc.) of the media of a media set for the features of the device to which it is provided such that media from various sources may be optimized or otherwise rendered compatible with the features of the digital devices. Adaptation of the media sets may additionally or alternatively include adaptation of the content of a media set for the particular digital device to which it is provided. For example, a user may provide a media set profile to be used across multiple digital devices, such as the user's personal tablet device and the user's work computer. Certain content otherwise meeting the media set profile may be filtered from the media set provided to one or more digital devices, such as the aforementioned work computer, as being in appropriate for that digital device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
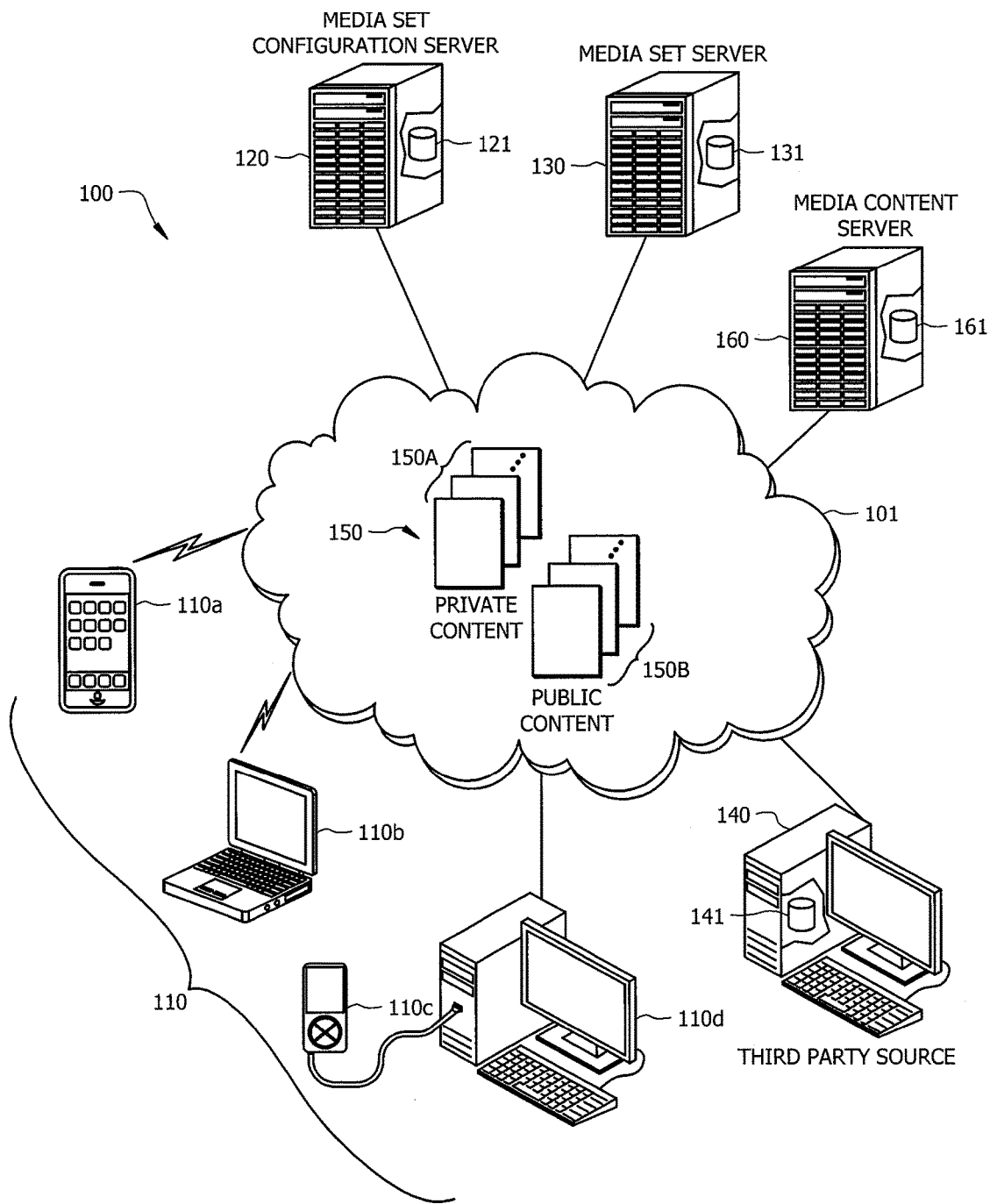
FIG. 1 shows a system adapted to provide dynamically updated media sets to personalized media features of applications according to embodiments of the invention.

FIG. 1 shows a system adapted to dynamically update personalized media features of applications according to embodiments of the invention. System 100 of the illustrated embodiment includes digital devices 110 each having one or more applications (shown in FIG. 2) operable thereon which implement a personalized media feature. Digital devices 110 are provided connectivity to network 101, such as may comprise the Internet, a local area network (LAN), a metropolitan area network (MAN), a wide area network (WAN), the public switched telephone network (PSTN), a cellular network, a wireless data network (e.g., wireless LAN (WLAN), general packet radio service (GPRS) network), a cable transmission network, and/or the like. Similarly, media set configuration server 120, media set server 130, media content server 160, and third party source 140 are provided connectivity to network 101. These systems are preferably adapted to cooperate to dynamically update personalized media features of applications operable upon digital devices 110 using media aggregated or otherwise collected from content 150. In particular, digital devices 110, media set configuration server 120 and media set server 130 of embodiments cooperate to provide a cloud computing based solution in which dynamic updates of personalized media features of applications operable upon digital devices 110 is provided as a network service.

The digital devices may comprise various platforms, such as smart phones (e.g., digital device 110*a*), portable computers (e.g., digital device 110*b*), media players (e.g., digital device 110*c*), and desktop computers (e.g., 110*d*). Of course, the digital devices which may be provided dynamically updated media sets according to embodiments of the invention are not limited to the foregoing exemplary digital device platforms and thus may include various other digital device platforms currently existing or later to be developed (e.g., tablet devices, Internet appliances, smart television sets, entertainment systems, etc.). The applications implementing personalized media features on the digital devices may likewise be various. For example, one or more digital device of digital devices 110 may execute an operating system (e.g., Microsoft WINDOWS or WINDOWS PHONE, Apple OS or iOS, Open Handset Alliance ANDROID, etc.) which provides a wallpaper feature and/or a screen saver feature allowing the use of personalized media. Likewise, one or more digital device of digital devices 110 may execute an application (e.g., a phone application, a texting application, etc.) which provides an alert feature (e.g., ringtone, avatar, etc.) allowing the use of personalized media. Irrespective of the platform configuration of a particular digital device and the particular applications implementing personalized media features thereon, digital devices for which dynamic updating of personalized media features of applications operable thereon is provided according to embodiments of the invention include an interface for providing network connectivity.

It should be appreciated that the connectivity provided with respect to network 101 need not be persistent, particularly with respect to digital devices 110. For example, ones of digital devices 110 may be highly mobile and thus only temporarily be connected to network 101. Additionally or alternatively, ones of digital devices 110 may operate to establish and terminate their network connection at will, such as to reduce power consumption, to minimize connection fees, etc. Accordingly, embodiments herein are operable to accommodate such non-persistent network connections, as will be better appreciated from the discussion which follows.

The network connections utilized according to embodiments herein may be wired or wireless. For example, digital device 110*d* (shown in the illustrated embodiment as a desktop computer) may utilize a wired network connection (e.g., copper wire, fiber optic line, etc.). By way of further examples, digital devices 110*a* and 110*b* (shown in the illustrated embodiment as a smart phone and portable computer, respectively) may utilize wireless network connections (e.g., cellular link, WIFI link, etc.). It should be appreciated that the network connection utilized need not be direct. For example, digital device 110*c* (shown in the illustrated embodiment as a media player) is provided a connection to network 101 via digital device 110*d* (shown in the illustrated embodiment as a desktop computer).

Each of media set configuration server 120, media set server 130, media content server 160, and third party source 140 comprise processor-based systems configured to provide operation as described herein. Such processor-based systems may comprise a general purpose processor (e.g., a processor from the Intel PENTIUM family of processors available from Intel Corporation or a processor from the AIM Alliance POWERPC family of processors) and/or a special purpose processor (e.g., an application specific integrated circuit (ASIC) or field programmable gate array (FPGA)), associated memory (e.g., random access memory (RAM), read only memory (ROM), bulk memory (e.g., disk memory or optical memory)), and input/output (e.g., keyboard, digital pointer, display, and network interface card (NIC)) operating under control of an instruction set (e.g., software and/or firmware) to perform the functions described herein. It should be appreciated that, although shown as separate systems, various such devices may be combined into an integrated system. For example, media set configuration server 120 and media set server 130 may be combined into a single system performing both functions. Likewise, the individual systems represented may be provided as multiple systems, such as to provide a server farm comprising a plurality of media set configuration servers 120 and/or media set servers 130.

Each of digital devices 110 also comprise processor-based systems configured to provide operation as described herein. As with the processor-based systems discussed above, such processor-based systems may comprise a general purpose processor and/or special purpose processor, associated memory, and input/output operating under control of an instruction set to perform the functions described herein. However, some or all of digital devices 110 may nevertheless have less computing resources (e.g., less processing power, less memory, etc.) than the processor-based systems of media set configuration server 120 and/or media set server 130. The cloud based implementation of dynamically updating personalized media features of applications on digital devices 110 according to embodiments alleviates the demands placed upon the resources of digital devices 110.

Figure 2:
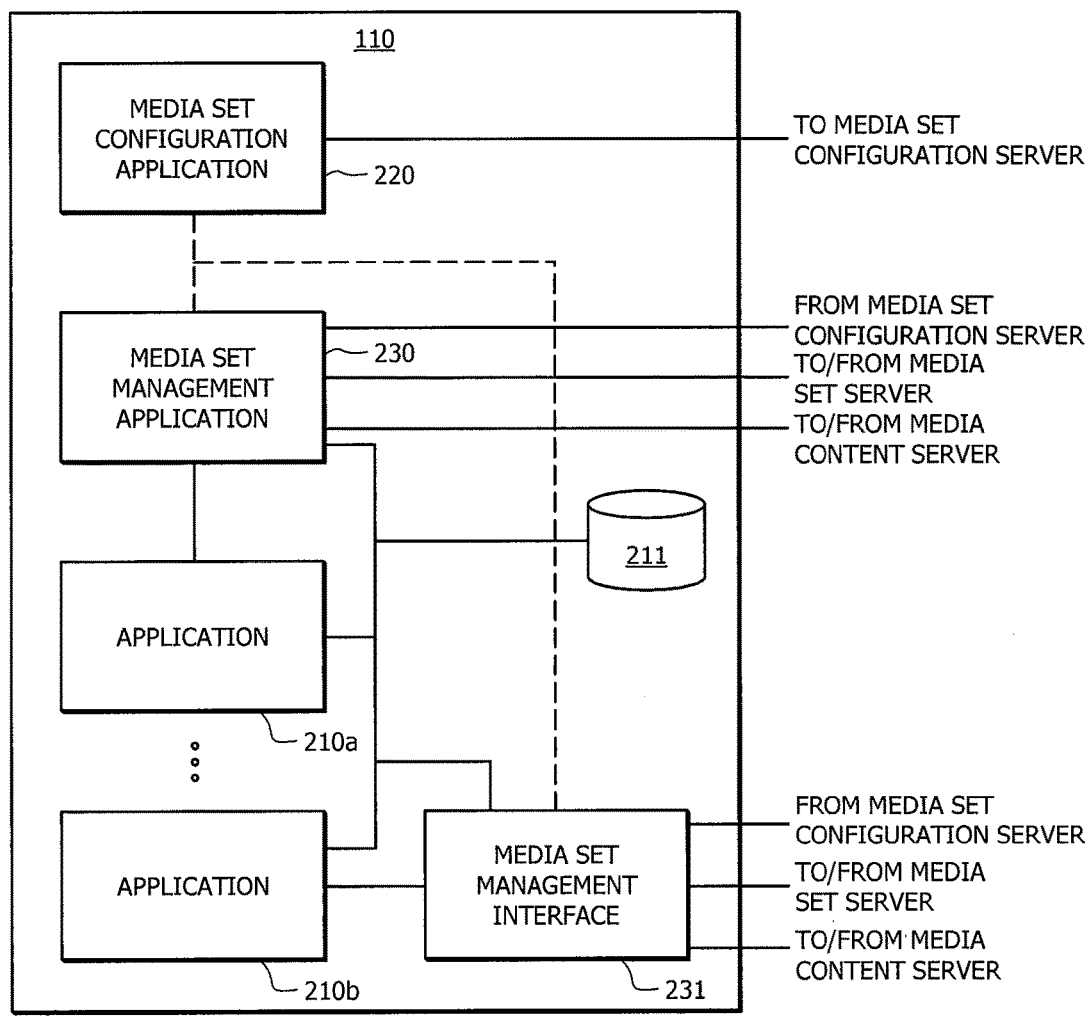
FIG. 2 shows detail with respect to a digital device adapted to implement dynamically updated media sets according to embodiments of the invention.

FIG. 2 shows detail with respect to a digital device of digital devices 110 adapted for dynamic updating of personalized media features of applications operable thereon. Each digital device of digital devices 110 may be configured as shown in FIG. 2 or may include a subset of the functional blocks shown, depending upon the functionality desired and the capabilities of the particular digital device.

The embodiment of digital device 110 illustrated in FIG. 2 includes applications 210*a* and 210*b*, media set configuration application 220, media set management application 230, and media set management interface 231. Applications 210*a* and 210*b* comprise applications which are operable to implement a personalized media feature according to the concepts herein. These applications may comprise legacy applications (e.g., application 210*a*) which are enabled to implement dynamically updated media sets herein, such as through operation of a media set management application (e.g., media set management application 230). Additionally or alternatively, the applications may comprise dynamic media set compliant applications (e.g., application 210*b*) which natively implement dynamically updated media sets herein, such as using a software development kit media management interface (e.g., media set management interface 231). Media set configuration application of embodiments, which may comprise a client application native to digital device 110 or a web-based client application, provides a user interface to a media set configuration system (e.g., media set configuration server 120 of FIG. 1) for inputting media set criteria and generating/selecting media set profiles. Media set management application 230 provides an interface to a media set source (e.g., media set server 130 of FIG. 1) for obtaining dynamically updated media sets and provides management of media sets for dynamically updating media sets with respect to one or more application (e.g., application 210a). Functionality of a dynamic media set compliant application (e.g., functionality of application 210b), perhaps in cooperation with functionality of a media management interface (e.g., media set management interface 231) provides operation as described above with respect to media set management application 230 according to embodiments.

Figure 3:
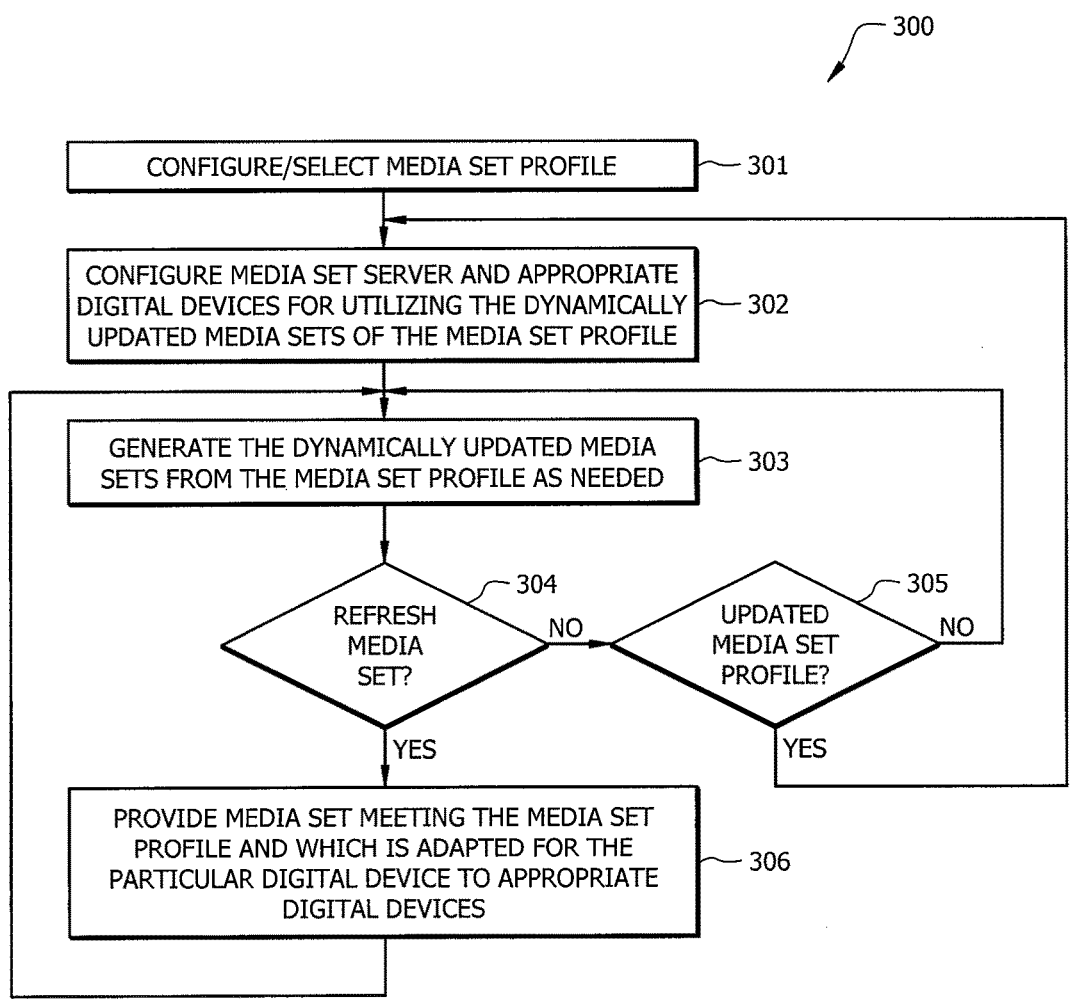
FIG. 3 shows a flow diagram of operation to provide implement dynamically updated media sets according to embodiments of the invention.

FIG. 3 shows a flow diagram of operation to provide dynamically updated media sets according to embodiments herein. In operation according to flow 300 of the illustrated embodiment, at block 301 a user may utilize media set configuration application 220 to configure a media set profile or select a preconfigured media set profile for use in dynamically updating personalized media features of applications. For example, a user may launch media set configuration application 220 on a digital device of digital devices 110 and specify criteria for media sets to be dynamically updated.

The foregoing media set criteria preferably provides information from which media relevant to the user's desires may be selected for aggregation as a media set for dynamically updating personalized media features of applications in accordance with the concepts herein. Accordingly, the media set criteria may specify subject matter with respect to the content of media. For example, the user may provide information identifying a place, person, event, etc., from which relevant content may be identified (e.g., using metadata, tags, filenames, etc. of the candidate media files). Additionally or alternatively, the use may specify time constraints with respect to the media. For example, the user may specify that media generated on or after a particular date is to be used to ensure that the content of the media set is kept fresh. The user may specify time parameters for the content, such as to create media sets having a desired temporal attribute (e.g., images and/or sounds from a period in the day, week, month or year, such as images at dawn, a venue during a weekend, holiday scenes, and the like). Likewise, the user may specify time restrictions with respect to particular subject matter of the media content, such as to prevent situationally inappropriate images and/or sounds from being presented on a digital device at various times (e.g., during working hours, during times of worship, when sleeping, etc.) and/or to enable particular images and/or sounds to be presented on a digital device at various times (e.g., images and sounds captured during morning hours to be presented on digital devices during morning hours, images and sounds captured during evening hours to be presented on digital devices during morning hours, images and sounds of holiday celebrations to be presented on digital devices during the appropriate holiday season, etc.). The user may additionally or alternatively specify location constraints and/or restrictions for the media of the media sets. The location constraints may, for example, identify the media for the media sets, such as media generated at a particular location. The location restrictions may establish restrictions with respect to particular subject matter of the media content, such as to prevent situationally inappropriate images and/or sounds from being presented on a digital device at various locations (e.g., at the office, at church, etc.) and/or to enable particular images and/or sounds to be presented on a digital device at various locations (e.g., images and sounds of water sports to be presented on digital devices while the user is at the beach or lake, images and sounds of local points of interest to be presented on digital devices during a visit to a city, etc.). Moreover, device constraints may be specified by the user, wherein such device constraints may establish subject matter restrictions for particular devices (e.g., selecting/preventing particular subject matter to be provided in media sets to a particular device, such as to accommodate the use of the device in certain situations), location restrictions for particular devices (e.g., locations at which media sets or particular content are/are not to be presented), and/or features of devices to utilize or not to utilize (e.g., utilize a high/low resolution display feature of the device, utilize sound with images, etc.).

The foregoing media set criteria may be used to create media set profiles to generate media sets for dynamically updating personalized media features of the applications. Accordingly, as part of the operation at block 301 of the illustrated embodiment of flow 300, the media set criteria may be provided to media set configuration server 120 for generation of a corresponding media set profile. The media set profiles generated preferably utilize media set criteria to facilitate identification of media which is relevant to the user and which is refreshed as desired by the user. Media set profiles may be stored by media set configuration server 120, such as within database 121, for providing to appropriate ones of digital devices 110 and/or media set server 130 for use in providing dynamically updated personalized media features of applications according to embodiments herein.

In an alternative process, a user may select a preconfigured media set profile for use in dynamically updating personalized media functions of applications. For example, at block 301 a user may launch media set configuration application 220 on a digital device of digital devices 110 and select a preconfigured media set profile, having corresponding media set criteria, for media sets to be dynamically updated. A third party (e.g., sports team franchises, musical groups, political parties, social organizations, governmental entities, commercial enterprises, etc.) utilizing third party source 140, for example, may create media set profiles (e.g., related to their goods, services, interests, activities, etc.) and make those media set profiles, and the media content, available for use by users. Such preconfigured media set profiles may be stored to database 141 and/or database 121, or elsewhere in network 101, for access by media set configuration application 220 and/or media set configuration server 120.

The foregoing preconfigured media set profiles facilitate a user interested in the third party or otherwise interested in media associated with such third party to readily implement dynamic updating of personalized media features using media associated with or otherwise identified by the third party by selecting an appropriate published media set profile. It should be appreciated that the third party may additionally publish media (e.g., content from sporting events, musical venues, political rallies, social events, government works, product announcements, etc.) corresponding to the foregoing media set profiles to facilitate their use. Such embodiments provide unique advertising and media release opportunities for the participating third parties.

Information in addition to media set criteria or selection of a media set profile may be provided at block 301 of embodiments. For example, a user may specify which application the resulting dynamically updated media sets are to be applicable to (e.g., wallpaper, screensaver, call alert avatar, etc.) and/or the digital devices of their plurality of digital devices the dynamically updated media sets are to be provided. Likewise, information such as a time or date at which the media set profile is to be active/inactive, whether the media set profile is to be public (whether for limited publication, such as to a circle of friends, or for general publication), and/or other media set implementation information may be provided. At least some of the foregoing information, whether implementation information or media set criteria information, may be provided in a user profile, such as in user preferences of a user account, associated with the user according to embodiments.

Irrespective of whether a media set profile is generated or selected at block 301, media set configuration server 120 of embodiments configures the appropriate applications (e.g., dynamic media set compliant applications, such as application 210b) and/or a media set management applications (e.g., media set management application 230 operable with legacy applications, such as application 210a) for operation to utilize dynamically updated media sets consistent with the media set profile at block 302. For example, media set configuration server 120 may provide (e.g., for storage in database 211) the media set profile generated/selected by a user, or some portion of the media set criteria, to appropriate ones of the user's devices for their use in obtaining and implementing dynamically updated media sets. Correspondingly, media set configuration server 120 may provide (e.g. for storage in database 131) the media set profile generated/selected by a user, or some portion of the media set criteria, to media set server 130 for its use in providing dynamically updated media sets.

It should be appreciated that digital devices of the various digital devices may be highly mobile or otherwise have a non-persistent network connection. Accordingly, the media set profiles, or some portion thereof, are provided to the appropriate digital devices of digital devices 110 for their use in autonomously implementing particular operational aspects for facilitating dynamic media set operation. For example, media set management application 230 may use the media set profile information stored within database 211 to determine if media set server 130 is to be polled for a fresh media set, such as based upon one or more media set criteria and the digital device having been disconnected from the network for a period of time suggesting a media set may have perished, the locus information (e.g., local time, location, weather, etc.) suggesting a media set refresh is appropriate, etc.

The media set profiles, or some portion thereof, are provided to media set server 130 for its use in generating appropriate media sets. For example, media set server 130 may use the media set profile information stored within database 131 to determine appropriate media for aggregating into media sets for dynamically updating personalized media features of various applications. Suitable media may be aggregated or otherwise collected by media set server 130 from media of content 150 available from network 101 and stored in database 161 of media content server 160.

It should be appreciated that media set configuration server 120 may, at block 302 of the illustrated embodiment, provide processing with respect to the media set profiles and/or associated information prior to providing the information to digital devices 110 and media set server 130. For example, media set configuration server 120 of embodiments may process the media set profiles for providing identification of the particular digital devices of digital devices 110 the media set profiles are to apply. Such processing may include providing restrictions or limitations with respect to the applicability of a media set or its content, or possibly generating a plurality of appropriately restricted/non-restricted media sets, for implementing various media set criteria relevant to particular digital devices. Processing provided by media set configuration server 120 of embodiments may provide information useful in implementing dynamically updated media sets, such as to provide digital device attribute information useful to media content server 160 in formatting media for the individual digital devices, providing information regarding the media set refresh frequency, such as based upon the digital device resources, connectivity profile, the media set criteria, etc., and the like.

At block 303 of the illustrated embodiment, media set server 131 generates one or more media sets using the media set criteria from the media set profile. The generated media sets of embodiments include media information about media, or other digital packets of content which include media (e.g., static images, moving images, sound, or combinations thereof) appropriate to the particular application being provided dynamically updated media sets. Moreover, one or more such media sets may be generated in association with a media set profile. For example, where the media set profile includes media set criteria for different times, locations, etc., one or more media set may be generated to meet the variations of this criteria (e.g., a media set for a first time/location, a media set for a second time/location, and so on). Similarly, where the media set profile includes media set criteria for different digital devices, one or more media set may be generated which are adapted to meet the variations of this criteria (e.g., a first media set for a first device/group of devices, a second media set for a second device/group of devices, and so on). It should be appreciated that such media sets may each meet particular criteria of the media set profile (e.g., a sports theme, a holiday, particular subject matter, etc.), but may differ according to other particular criteria of the media set profile (e.g., a time of day represented in the media, a location represented in the media, restrictions on content in the media, etc.). The generated media sets may be stored within database 131 by media set server 130 for later provision to and use by the appropriate digital devices of digital devices 110.

Media used by a media set herein may be obtained from a number of sources according to embodiments of the invention. For example, media may be obtained for generating media sets by media set server 130 from private sources (e.g., media of private content 150a provided by one or more private sources of media), such as the user's social media account(s) (e.g., MYSPACE, FACEBOOK, TWITTER, etc.), the user's media storage/management account(s) (e.g., MIMEDIA, CARBONITE, MOZY, etc.), the user's media sharing account(s) (e.g., DROPBOX, SUGAR SYNC, INSTAGRAM, PHOTOBUCKET, FLICKER, etc.), and the like. Additionally or alternatively, media sets herein may be generated from public sources (e.g., media of public content 150b provided by one or more public sources media), such as publicly available portions of social media accounts, publicly available portions of media sharing accounts, public Internet content, content published for use in media sets, and the like. Media content server 160 of embodiments herein may not only acquire appropriate media for media sets from any of the foregoing sources, but the media content server may aggregate media from a plurality of sources (e.g., media of content 150 from any or a combination of sources) to generate a media set meeting the user's media set profile which otherwise would not exist as a collection.

Media set server 130 and media content server 160 of embodiments operate to provide services in addition to the aforementioned media set generation. For example, media content server 160 may operate to dynamically provide media of the media sets to the various digital devices which are not only relevant to the applicable media set profile, but which are adapted for the particular digital device to which the media set is provided. Such adaptation may include adjusting a resolution, a size, a sampling rate, a frame rate, etc. of the media of a media set for the features of the device to which it is provided such that media from various sources may be optimized or otherwise rendered compatible with the features of the digital devices. It should be appreciated that adaptation of the media for particular digital devices by media content server 160 may result in the generation of multiple permutations of media sets (e.g., a media set having the adaptation and a media set not having the adaptation). Alternatively, a generated media set may be adapted for particular digital devices when being provided thereto, such as by implementing a transcoder to adapted media of a media set for the digital device as the media is being provided to the digital device, filtering particular content from the media set (e.g., omitting particular media files) as the media set is provided to the digital device, etc.

Having generated one or more media sets using a media set profile, applications 210 are preferably dynamically provided with one or more appropriate media sets, such as via media set management application 230 and/or media set management interface 231 operating in cooperation with media set server 130, for storage within database 211. Accordingly, at block 304 of the illustrated embodiment a determination is made as to whether the media set(s) of a device are to be refreshed. For example, if no media sets have yet been provided to the digital device (e.g., operation of the dynamically updated media sets is originally initiated), it may be determined that the media set(s) thereof are to be refreshed (in this case, actually initially provided). If one or more attribute associated with a digital device changes which is relevant to a media set criterion (e.g., the digital device changes location and the media set profile includes location criteria, the time of day changes and the media set profile includes time criteria, etc.) changes, it may be determined that the media set(s) of the digital device are to be refreshed. If a period of time sufficient to suggest (e.g., based solely upon the length of time, as a function of one or more media set parameter, etc.) a media set has perished it may be determined that media sets(s) are to be refreshed. From the foregoing it can be appreciated that it may be determined periodically, aperiodically, or a combination thereof that media sets are to be refreshed.

The determination to refresh media sets may be made by the digital device utilizing the media sets, the media server providing the media sets, or a combination thereof. For example, digital devices of digital devices 110 of embodiments are provided with a media set profile, or portion thereof, to facilitate autonomous determinations with respect to media set refreshing. Accordingly, when the digital device detects an event or other aspect indicative of a media set refresh (e.g., a change of location, time, reconnecting to the network, etc.), the digital device may analyze relevant information in association with the media set profile to determine if a media set is to be refreshed. Additionally or alternatively, media set server 130 of embodiments is provided with a media set profile, or portion thereof, which may be used in determinations with respect to media set refreshing. Accordingly, when the media set server detects an event or other aspect indicative of a media set refresh (e.g., a new media set profile or changes to media set criteria within a media set profile are detected, new content for a media set becomes available from a source of content 150, etc.), the media set server may analyze relevant information in association with the media set profile to determine if a media set is to be refreshed, perhaps in association with generating one or more media sets.

If at block 304 it is determined that media sets are not to be refreshed, processing according to the illustrated embodiment proceeds to block 305 wherein a determination is made as to whether a media set profile has been updated or changed. For example, media set configuration server 120, media set server 130, and/or media content server 160 may communicate to facilitate updating of or otherwise changing media set profiles. If it is determined at block 305 that media set profiles have not been updated, processing according to the illustrated embodiment returns to block 303. It should be appreciated that, although the media set profiles have not been updated, media sets provided in accordance with the media set profiles may nevertheless need to be generated/updated. For example, new media meeting the media set profile may be provided to media 150, media of a previously generated media set may no longer meet the media set profile (e.g., the media may parish due to crossing a time based freshness threshold), etc. If, however it is determined at block 305 that media set profiles have been updated, processing according to the illustrated embodiment returns to block 302 for configuring media set server 130 and appropriate digital devices of digital devices 110 in accordance with the updated media set profile.

If at block 304 it is determined that media sets are to be refreshed, processing according to the illustrated embodiment proceeds to block 306 wherein one or more media set are provided by media set server 130 and media content server 160 to the appropriate digital devices of digital devices 110 for use in dynamically updating the personalized media feature of an application or applications thereof (e.g., applications 210). As discussed above, the media sets may be adapted for particular digital devices or digital device configurations to which they are provided. Accordingly, media set server 130 may implement processing, such as transcoding, filtering, etc., when providing the media sets to particular ones of the digital devices.

It should be appreciated that the resources of some or all of the digital devices may be somewhat limited. For example, the memory capacity of digital devices, such as smart phones, may be relatively small. Accordingly, although a plurality of media sets may be generated with respect to a particular media set profile, such as for time dependent criteria, location dependent criteria, etc., a reduced number of such media sets may be provided to the digital device at any particular time. For example, media set configuration server 120 and/or media set sever 130 of embodiments may analyze the resources of a digital device, and perhaps the use profile (e.g., how often a network connection is established, the mobility patterns of the digital device, etc.) to determine the media sets of a plurality of media sets to provide to the digital device. As particular criterion or other aspects change, the subset of media sets may be replaced when a then appropriate subset of media sets.

Accommodation of digital device resource limitations may be made in addition to or in alternative to the foregoing providing media set subsets to the digital device. For example, the media sets themselves may be adapted to include a reduced set of media, such as to accommodate memory capacity limitations of a digital device, for providing to those digital devices.

Having been provided with one or more media sets at block 306, applications of the digital devices having a personalized media feature are thereafter enabled to utilize dynamically updated media sets providing personalized content which is highly relevant to the user, as determined using media set criteria of a media set profile. For example, media set management application 230 may operate to provide media of a media set to a personalized media feature of application 210a. Similarly, application 210b may directly access media sets, as may have been provided by media set management interface 231, to obtain media for a personalized media feature thereof. Such media sets may provide a plurality of media such that the personalized media feature is periodically or aperiodically updated from the media of a media set. Moreover, a plurality of media sets may be utilized such that media from a particular media set is used at an appropriate time in periodically or aperiodically updating the personalized media feature. Accordingly, a personalized media feature of an application, such as a wallpaper feature, a screen saver feature, an alert sound feature, an alert avatar feature, etc., may be dynamically updated from media of one or more media sets meeting particular criteria of a media set profile, such as time, location, subject matter, etc.

Using the foregoing techniques, the user is enabled to configure various applications across multiple digital device platforms conveniently and using a common interface. In particular, the user may generate or select one or more media set profiles for use in providing dynamically updated personalized media with respect to one or more applications operable upon one or more digital devices.

Although the foregoing example has been described with reference to a user providing/selecting media set profiles for implementation upon the user's digital devices, it should be appreciated that the concepts herein apply to sharing situations as well. For example, a user may generate a media set profile to include images of a recent vacation trip, perhaps configured to display images captured at particular times of the day within an appropriate one of morning, midday, evening, and night time windows, and share that media set profile (and perhaps the user's otherwise private media) with friends and family. The user may thus essentially act as the aforementioned third party source. Similarly, a user may generate or select a media set profile to include recent images of a favorite rock band (perhaps as provided by third party source 140) and share that media set profile with other fans of the rock band. Such embodiments facilitate not only the dynamic updating of personalized media features of one or more applications, but also provide a social networking attribute allowing circles of users to share content of common interest.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    collecting media set profile information for use in updating media utilized by a personalized media feature of a particular application of a digital device;
    generating at least one dynamically updated media set using the media set profile information, wherein the at least one dynamically updated media set is related to the particular application of the digital device, wherein the media set profile information comprises criteria to specify a location constraint for media items of the at least one dynamically updated media set, wherein the at least one dynamically updated media set comprises media items aggregated from a plurality of different sources;
    adapting media items of the at least one dynamically updated media set for the digital device;
    providing the at least one dynamically updated media set to the particular application of the digital device, wherein the personalized media feature of the particular application is configured to automatically select media items of the at least one dynamically updated media set in accordance with the criteria included in the media set profile information, wherein the particular application comprises one or more parameters that specify when to automatically execute the personalized media feature to display the selected media items at a display device, wherein the particular application comprises one or more parameters that specify when to automatically execute the personalized media feature to display the selected media items at a display device, and wherein the personalized media feature automatically selects the media items of the at least one dynamically updated media set by:
        determining whether a particular media item satisfies the location constraint, wherein the automatically selected media items comprise media items that satisfy the location constraint, wherein media items that do not satisfy the location constraint are not included in the automatically selected media items of the one or more dynamically updated media sets, and wherein a particular media item satisfies the location constraint when the particular item is at least one of: generated at one or more locations identified by the location constraint, and depicts subject matter associated with the one or more locations identified by the location constraint; and
    periodically providing one or more new media sets comprising one or more new media items, wherein the personalized media feature of the application automatically selects new media items of the one or more new media sets in accordance with the criteria included in the media set profile information, and wherein the one or more new media sets comprise new media items aggregated from the plurality of different sources.

2. The method of claim 1, wherein the media set profile information comprises criteria to specify subject matter for media items of the at least one dynamically updated media set.

3. The method of claim 1, wherein the media set profile information comprises criteria to specify a time constraint for media items of the media set.

4. The method of claim 1, wherein the media set profile information comprises criteria to specify a device constraint for media items of the media set.

5. The method of claim 4, wherein the device constraint comprises subject matter restrictions with respect to media items of the media set for one or more digital device.

6. The method of claim 4, wherein the device constraint comprises location restrictions with respect to media items of the media set for one or more digital device.

7. The method of claim 1, wherein the generating at least one dynamically updated media set comprises:
obtaining the media items from a networked source of media items.

8. The method of claim 7, wherein at least a portion of the media items are obtained from a private networked source of media items.

9. The method of claim 7, wherein at least a portion of the media items is obtained from a public networked source of media items.

10. The method of claim 1, wherein the adapting the media items for the digital device comprises:
dynamically transcoding the media items for features of the digital device to which it is provided.

11. The method of claim 1, wherein the adapting the media items for the digital device comprises:
filtering content of the media set for the digital device to which it is provided.

12. The method of claim 1, wherein the providing the at least one dynamically updated media set to the digital device comprises:
providing the at least one dynamically updated media set to a plurality of digital devices having applications implementing personalized media features.

13. The method of claim 12, wherein the plurality of digital devices comprise a plurality of different digital devices of a same user.

14. The method of claim 12, wherein the plurality of digital devices comprise a digital devices of a plurality of users.

15. A method comprising:
receiving media set profile information for configuring a personalized media feature of an application of a digital device;
receiving one or more dynamically updated media sets generated using the media set profile information, wherein the one or more dynamically updated media sets is related to the application implementing the personalized media feature of the digital device, wherein the media set profile information comprises criteria to specify a location constraint for media items of the one or more dynamically updated media sets, wherein the one or more dynamically updated media sets comprise media items aggregated from a plurality of different sources, and wherein the media items of the one or more dynamically updated media sets are adapted for the digital device;
automatically selecting, by a personalized media feature of the application, media items of the one or more dynamically updated media sets in accordance with the criteria included in the media set profile information to implement dynamically updated media items in the personalized media feature, wherein the one or more dynamically updated media sets comprise media items aggregated from a plurality of different sources, wherein the application comprises one or more parameters that specify when to automatically execute the personalized media feature to display the automatically selected media items at a display device, and wherein the personalized media feature is configured to automatically select the media items of the one or more dynamically updated media sets comprises:
determining whether a particular media item satisfies the location constraint, wherein the automatically selected media items comprise media items that satisfy the location constraint, wherein media items that do not satisfy the location constraint are not included in the automatically selected media items of the one or more dynamically updated media sets, and wherein a particular media item satisfies the location constraint when the particular item is at least one of: generated at one or more locations identified by the location constraint, and depicts subject matter associated with the one or more locations identified by the location constraint; and
periodically refreshing the media items of the one or more dynamically updated media sets in accordance with the information of the media set profile information, the refreshing comprising:
receiving one or more new media sets comprising one or more new media items; and
automatically selecting, by the personalized media feature of the application, new media items of the one or more new media sets in accordance with information of the media set profile information to implement the dynamically updated media items in the personalized media feature, wherein the one or more new media sets comprise new media items aggregated from the plurality of different sources, and wherein the one or more parameters of the application specify when to automatically execute the personalized media feature to display the selected new media items at the display device.

16. The method of claim 15, wherein the receiving media set profile information comprises:
inputting media criteria for a media set of the media set profile infomration for implementing dynamic updating of personalized media features.

17. The method of claim 15, wherein the receiving media set profile information comprises:
selecting a published media set profile for implementing dynamic updating of personalized media features, wherein the published media set profile is associated with a third-party.

18. The method of claim 15, wherein the receiving media set profile information comprises:
providing the media set profile information for use by a plurality of digital devices having applications implementing personalized media features.

19. The method of claim 18, wherein the plurality of digital devices comprise a plurality of different digital devices of a same user.

20. The method of claim 18, wherein the plurality of digital devices comprise a digital devices of a plurality of users.

21. The method of claim 15, wherein the media set profile information comprises criteria to specify subject matter for the media items of the media set.

22. The method of claim 15, wherein the media set profile information comprises criteria to specify a time constraint for the media items of the media set.

23. The method of claim 15, wherein the media set profile information comprises criteria to specify a device constraint for the media items of the media set.

24. The method of claim 23, wherein the device constraint comprises media subject matter restrictions with respect to the media items of the media set for one or more digital device.

25. The method of claim 23, wherein the device constraint comprises media location restrictions with respect to media items of the media set for one or more digital devices, the media location restrictions configured to prevent display and/or presentation of particular media items at a digital device when the digital device is located at one or more particular locations and to enable display and/or presentation of other media items at the digital device when the digital device is located at the one or more particular locations, wherein the other media items comprise content that is representative of the one or more particular locations.

26. The method of claim 15, wherein the configuring the digital device for utilizing media sets generated using the media set information comprises:
configuring the digital device for autonomously implementing dynamic media sets using criteria of the media set profile information.

27. The method of claim 26, wherein the autonomously implementing dynamic media sets comprises:
autonomously obtaining updated media sets as a function of criteria of the media set profile information.

28. The method of claim 15, wherein utilizing media items of the one or more dynamically updated media sets in the personalized media feature of the application comprises:
providing media items through the personalized media feature which is highly relevant to a user of the digital device as determined using criteria of the media set profile.

29. The method of claim 28, wherein the dynamically updated media sets provide a plurality of media items, and wherein the personalized media feature is updated from the media items of a media set in accordance with the criteria of the media set profile.

30. The method of claim 28, wherein the personalized media feature of the application comprises a wallpaper feature, and wherein automatically executing the personalized media feature to display the selected media items at the display device comprises automatically configuring the wallpaper feature to display the selected media items as a wallpaper at the display device.

31. The method of claim 28, wherein the personalized media feature of the application comprises a screen saver feature, and wherein automatically executing the personalized media feature to display the selected media items at the display device comprises automatically configuring the screen saver feature to display one or more media items of the selected media items at the display device.

32. The method of claim 28, wherein the personalized media feature of the application comprises an alert sound feature.

33. The method of claim 28, wherein the personalized media feature of the application comprises an alert avatar feature.

34. A system comprising:
a media set configuration server configured to adapt digital devices for utilizing dynamically updated media sets in accordance with media set profile information for use in updating media items utilized by personalized media features of applications of the digital devices; and
a media set server configured to:
generate one or more dynamically updated media sets using the media set profile information and to provide the generated dynamically updated media sets to the digital devices in accordance with the media set profile information, wherein the media set profile information comprises criteria to specify a location constraint for media items of the one or more dynamically updated media sets, wherein the one or more dynamically updated media sets comprise media items aggregated from a plurality of different sources, wherein the dynamically updated media sets are related to applications of the digital devices, wherein a particular personalized feature of a particular application is configured to select media items of a particular media set in accordance with the criteria included in the media set profile information of a particular media set profile to implement dynamically updated media in the particular personalized feature of the particular application, and wherein the particular application comprises one or more parameters that specify when to automatically execute the particular personalized media feature to display the particular media items at a display device, and wherein the personalized feature automatically selects the media of the particular media set by:
determining whether a particular media item satisfies the location constraint, wherein the selected media items comprise media items that satisfy the location constraint, wherein media items that do not satisfy the location constraint are not included in the automatically selected media of the one or more dynamically updated media sets, and wherein a particular media item satisfies the location constraint when the particular media item is at least one of: generated at one or more locations identified by the location constraint, and depicts subject matter associated with the one or more locations identified by the location constraint; and
periodically provide one or more new media sets comprising one or more new media items to the digital devices, wherein the personalized media feature of the application automatically selects new media items of the one or more new media sets in accordance with the criteria included in the media set profile information, and wherein the one or more new media sets comprise new media items aggregated from the plurality of different sources.

35. The system of claim 34, wherein the media set configuration server is further configured to adapt the media set server with the media set profile information.

36. The system of claim 34, further comprising:
a media set management application disposed on a digital device of the digital devices and configured to be adapted by the media set configuration server for utilizing dynamically updated media sets in accordance with the media set profile information.

37. The system of claim 36, wherein adapting media set management by the media set configuration server includes the media set configuration server providing at least a portion of the media set profile information to a media set management application for the media set management application autonomously implementing dynamic media sets using criteria of the media set profile information.

38. The system of claim 34, further comprising:
a media set management interface disposed on a digital device of the digital devices and configured to facilitate adapting an application implementing a personalized media feature by the media set configuration server for utilizing dynamically updated media sets in accordance with the media set profile information.

39. The system of claim 38, wherein adapting the application by the media set configuration server includes the media set configuration server providing at least a portion of the media set profile information to the application via the media set management interface for the application autonomously implementing dynamic media sets using criteria of the media set profile information.

40. The system of claim 34, wherein the one or more media sets comprise media items selected from a networked source of media using criteria of the media set profile information.

41. The system of claim 40, wherein the networked source of media items comprises a private networked source of media items.

42. The system of claim 40, wherein the networked source of media items comprises a public networked source of media items.

43. A system comprising:
a media content server configured to:
deliver media items of one or more dynamically updated media sets, to digital devices, using criteria of media set profile information, wherein the criteria of the media set profile information comprises a location constraint for media items of the at least one dynamically updated media set, wherein the media set profile information is used in updating the media items in the media sets for use by personalized media features of applications of the digital devices, wherein the one or more media sets include media items obtained from a networked source of media items using the criteria of the media set profile information; and
dynamically transcode the media items of the one or more dynamically updated media sets for use by a respective digital device in accordance with the media set profile information, wherein each of the one or more dynamically updated media sets is related to an application implementing personalized media features of the respective digital device, wherein a particular personalized feature of a particular application is configured to select media items of a particular media set in accordance with the criteria included in a particular media set profile to implement dynamically updated media items in the personalized media feature, and wherein the particular application comprises one or more parameters that specify when to automatically execute the particular personalized media feature to display the particular media items at a display device, and wherein the particular personalized feature is configured to automatically select the media items of the at least one dynamically updated media set by:
determining whether a particular media item satisfies the location constraint, wherein the automatically selected media items comprise media items that satisfy the location constraint, wherein media items that do not satisfy the location constraint are not included in the automatically selected media items of the one or more dynamically updated media sets, and wherein a particular media item satisfies the location constraint when the particular item is at least one of: generated at one or more locations identified by the location constraint, and depicts subject matter associated with the one or more locations identified by the location constraint; and
a media set server configured to periodically provide one or more new media sets comprising one or more new media items to the digital devices, wherein the personalized media feature of the application automatically selects new media items of the one or more new media sets in accordance with the criteria included in the media set profile information, and wherein the one or more new media sets comprise new media items aggregated from a networked source of media items.

44. The system of claim 43,
wherein the media set server is configured to generate the one or more dynamically updated media sets using the media set profile information.

45. The system of claim 43, wherein the networked source of media items comprises a private networked source of media items.

46. The system of claim 43, wherein the networked source of media items comprises a public networked source of media items.

47. The system of claim 43, wherein the media content server comprises:
a transcoder configured to transcode media items of the dynamically updated media sets for features of the digital device to which it is provided.

48. The system of claim 43, wherein the digital devices comprise applications implementing personalized media features, wherein the media items of the one or more dynamically updated media sets are provided to the applications for the personalized media features.

* * * * *